(12) United States Patent
Pattichis et al.

(10) Patent No.: US 11,954,819 B1
(45) Date of Patent: Apr. 9, 2024

(54) SYSTEM AND METHODS FOR FAST AND SCALABLE 2D CONVOLUTIONS AND CROSS-CORRELATIONS FOR PROCESSING IMAGE DATABASES AND VIDEOS ON CPUS

(71) Applicant: UNM Rainforest Innovations, Albuquerque, NM (US)

(72) Inventors: Marios Stephanou Pattichis, Albuquerque, NM (US); Cesar Carranza, Miami Beach, FL (US); Daniel Llamocca Obregon, Clawson, MI (US)

(73) Assignee: UNM RAINFOREST INNOVATIONS, Albuquerque, NM (US)

(*) Notice: Subject to any disclaimer, the term of this patent is extended or adjusted under 35 U.S.C. 154(b) by 645 days.

(21) Appl. No.: 17/187,335

(22) Filed: Feb. 26, 2021

Related U.S. Application Data

(60) Provisional application No. 62/983,265, filed on Feb. 28, 2020.

(51) Int. Cl.
*G06T 3/40* (2006.01)
*G06T 1/60* (2006.01)

(52) U.S. Cl.
CPC . *G06T 3/40* (2013.01); *G06T 1/60* (2013.01)

(58) Field of Classification Search
CPC .... G06T 3/40; G06T 1/60; G06T 1/20; G06T 11/001; G06T 11/006; G06T 2210/52; G06T 2211/424; G06T 2211/428; G06T 5/002; G06T 5/001; G06T 2207/20056; G06F 17/153; G06F 9/3001; G06F 9/5066; G06F 17/14; G06F 17/141; G06F 17/142; G06F 9/4843; G06F 9/5044; G06V 10/431; G06V 10/50; G06V 10/955; G06V 10/94; H04N 9/8047; H04N 5/91; H04N 23/80; H04N 1/3216
See application file for complete search history.

(56) References Cited

U.S. PATENT DOCUMENTS

| | | | |
|---|---|---|---|
| 8,391,306 B2 * | 3/2013 | Ito | G06N 3/045 370/412 |
| 2010/0088356 A1 * | 4/2010 | Lloyd | G06T 1/20 708/404 |
| 2013/0088489 A1 * | 4/2013 | Schmeitz | G06T 5/003 345/419 |
| 2018/0007334 A1 * | 1/2018 | Lim | G06T 3/40 |
| 2018/0204313 A1 * | 7/2018 | Mahmood | G06F 17/142 |

(Continued)

OTHER PUBLICATIONS

Cesar Carranza et al., Fast 2D Convolutions and Cross-Correlations Using Scalable Architectures, IEEE Transactions on Image Processing (vol. 25, Issue: 5, May 2017) DOI: 10.1109/TIP.2017.2678799.

(Continued)

*Primary Examiner* — Jose L Couso
(74) *Attorney, Agent, or Firm* — Valauskas Corder LLC

(57) ABSTRACT

An optimal approach for computing convolutions and cross-correlations of large databases of images that can be arbitrarily large. Throughput is maximized by breaking each image into optimal blocks and then using overlap-and-add method to compute the final result. A parallelized 2D FFT is applied over each block that runs a thread for each physical core.

4 Claims, 6 Drawing Sheets

(56) References Cited

U.S. PATENT DOCUMENTS

2018/0240221 A1* 8/2018 Rijnders .............. G06V 10/431
2021/0064688 A1* 3/2021 Saeed ................... G06N 3/063

OTHER PUBLICATIONS

Cesar Carranza et al., Fast and Scalable Computation of the Forward and Inverse Discrete Periodic Radon Transform, IEEE Transactions on Image Processing (vol. 26, Issue: 1, Jan. 2016) DOI: 10.1109/TIP.2015.2501725.

* cited by examiner

```
 1: function OPTBLOCKSIZE(N, n)
    ▷ Algorithm computes image block size for
    ▷ optimal throughput.
    ▷ Inputs:
    ▷    N: input image frame size.
    ▷    n: kernel size. Assume that: n ≪ N.
    ▷ Outputs:
    ▷    n_opt: optimal block size.

▷ Use random values for optimization:
 2:     g ← GenRandomMatrix(N).
 3:     h ← GenRandomMatrix(n).

▷ Search for the optimal block size:
 4:     p_max ← 0.
 5:     n_max ← NextPowerOf2(N + n − 1)
 6:     for i = n to n_max do
 7:         r(i) ← Time(FastCpuConv(f, g, h, n + i − 1))
 8:         p(i) ← i²/r(i)
 9:         if p_max < p(i) then
10:             n_opt ← i
11:             p_max ← p(i)
12:         end if
13:     end for
14:     return n_opt
15: end function
```

FIG. 2

1: function FASTPARCONV($f, g, h, N$, init)
   ▷ Computes full linear 2D convolution of g and h.
   ▷ Inputs:
   ▷   $g$: image (or image block) of size $P \times P$.
   ▷   $h$: convolution kernel of size $Q \times Q$.
   ▷   $N$: output size ($N \geq P + Q - 1$).
   ▷   init: if True initializes variables in memory.
   ▷ Outputs:
   ▷   $f$: linear convolution output ($f = g * h$).

2:   if init then
3:       Allocate $f, g, h, H$ with optimal padding
4:       and memory alignment.
5:       $h \leftarrow$ VectorCopyZeroPad($h$)
6:       $H \leftarrow$ FastParDFT ($h$, MaxPhysicalCores)
7:   end if

▷ Convert 8-bit image (or image block) $g$ into
   ▷ floating-point and move into pre-alloc. memory:
8:   $g \leftarrow$ ConvertZeroPadCopy ($g$)

9:   $G \leftarrow$ FastParDFT ($g$, MaxPhysicalCores)
10:  $F \leftarrow$ VectorPoint2PointMult ($G, H$)
11:  $f \leftarrow$ FastParInvDFT ($F$, MaxPhysicalCores)

▷ Remove extra padding used for memory alignment:
12:  $f \leftarrow$ VectorCrop($f$)
13: end function

FIG. 5

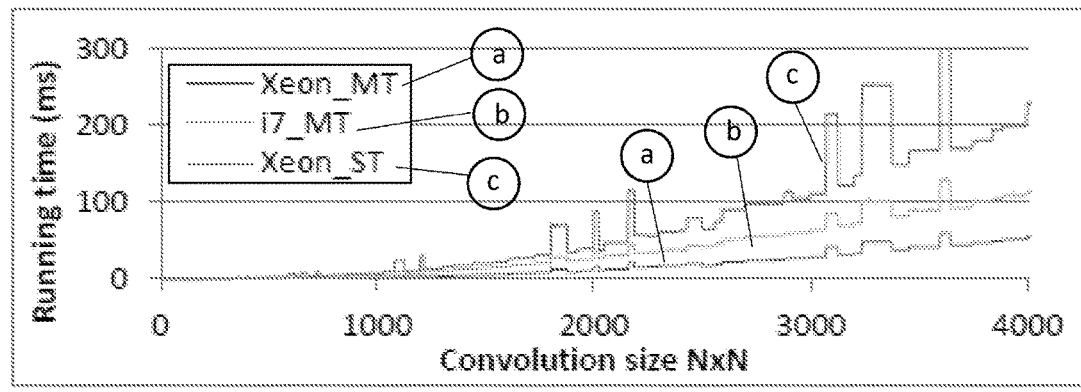
FIG. 6
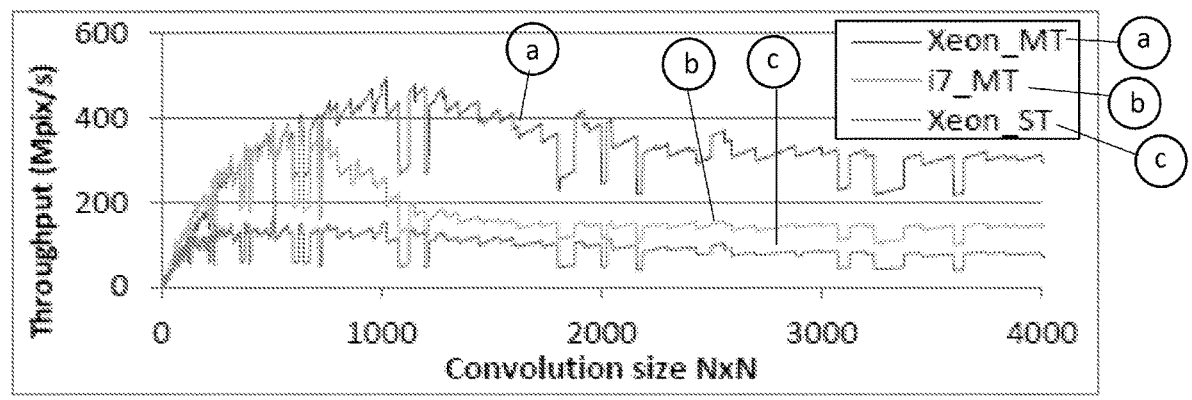
FIG. 7
| Output Size | RT (ms) | Mpix/s | CPU | Notes |
|---|---|---|---|---|
| 3240 × 3240 | 33.50 | 313.36 | Xeon | SB, $n=11$ |
| 2160 × 2160 | 30.92 | 150.89 | i7 | SB, $n=11$ |
| 2304 × 2304 | 15.68 | 338.55 | Xeon | SB, $n=11$ |
| 1600 × 1600 | 16.10 | 159.01 | i7 | SB, $n=11$ |
| 4066 × 2038 | 17.68 | 468.69 | Xeon | MB, 8 blocks, $n=11$ |
| 4016 × 2008 | 22.24 | 362.60 | i7 | MB, 32 Blocks, $n=11$ |
| 4096 × 2048 | 15.92 | 526.53 | Xeon | TF, $n=3$, 8 out channels |
| 4096 × 2048 | 22.80 | 367.85 | Xeon | TF, $n=5$, 8 out channels |
| 4096 × 2048 | 281.92 | 29.75 | Xeon | TF, $n=11$, 8 out channels |
| 4096 × 2048 | 214.88 | 38.98 | Xeon | TF, $n=3$, 1 out channel |
FIG. 8

SYSTEM AND METHODS FOR FAST AND SCALABLE 2D CONVOLUTIONS AND CROSS-CORRELATIONS FOR PROCESSING IMAGE DATABASES AND VIDEOS ON CPUS

CROSS-REFERENCE TO RELATED APPLICATIONS

This application claims the benefit of U.S. Provisional Application No. 62/983,265 filed on Feb. 28, 2020, incorporated by reference in its entirety.

FEDERALLY-SPONSORED RESEARCH OR DEVELOPMENT

This invention was made with government support under 1842220 awarded by the National Science Foundation (NSF). The government has certain rights in the invention.

FIELD OF THE INVENTION

The invention relates generally to image and video processing. More specifically, the invention relates to the computation of convolutions and cross-correlations for large image databases or databases including videos of large image sizes.

BACKGROUND OF THE INVENTION

Convolutions and cross-correlations dominate image processing operations. In implementing convolutional neural networks (CNNs), it is estimated that the computations associated with the convolutional layers account for about 90% of the total computations. For neural-network training on large image databases or digital videos, there is clearly a need to compute 2D convolutions and cross-correlations efficiently. Furthermore, several image and video processing operations can benefit from fast convolutions and cross-correlations.

The fast computation of compute 2D convolutions and cross-correlations has been widely researched. For small kernels, there is the computation of fast convolution using a sliding window, the use of separable convolutions, and the separable approximation of non-separable kernels. However, the use of the transform-domain methods is needed for larger kernels. Over sufficiently large kernels, the two-dimension (2D) fast Fourier transform (FFT) based methods dominate, while the use of the 2D FFT requires complex-valued floating point arithmetic.

Alternatively, 2D convolutions and cross-correlations may be computed very fast in hardware using the 2D Discrete Periodic Radon Transform (DPRT). For example, it has been shown that 2D convolutions of images and kernels of size $(N/2) \times (N/2)$ can be computed in-parallel as fast as $6N+5n+17$ clock cycles ($n=\text{ceiling}(\log 2(N))$) based on the fast DPRT architecture developed in U.S. Pat. No. 10,049,469 issued Aug. 14, 2018, incorporated by reference.

Without access to custom hardware implementations, there is still a great need for computing fast convolutions and cross-correlations on modern CPUs. The obvious advantage of CPU methods comes from the fact that they provide access to relatively low-cost large-scale memory for training on large image formats. In other words, while CPUs can readily access 32 GB or 64 GB of the main memory, large amounts of memory remain prohibitively expensive for GPUs and FPGAs. Furthermore, 2D FFT libraries have been improved to take advantage of multiple physical cores, SIMD instructions, as well as the conjugate-symmetry for real-valued images and videos. Alternatively, for small convolution kernels, Tensorflow libraries are widely used for training deep learning systems.

What is needed is a system and methods for computing convolutions and cross-correlations for neural-network training on large image databases or digital videos of large image sizes. The invention satisfies this need.

SUMMARY OF THE INVENTION

The invention is directed to a fast and scalable system and methods that can be used to compute convolutions and cross-correlations for large image or video databases of arbitrarily large image sizes. More specifically, the system and methods can provide sustainable high-throughput performance for reasonably large convolution kernels and large images. To deal with moving large images effectively through the memory hierarchy, vector-based operations are used. To deal with the need to process arbitrary sizes without causing cache misses, an overlap-and-add approach is implemented that fits optimal image blocks into the local memory. Furthermore, for fast I/O, high-performance vector copy operations are used to move image blocks through local memory. Moreover, the invention may be integrated with existing high-performance 2D FFT libraries to deliver fast throughputs. A throughput is the rate for the number of processed frame pixels per second.

The method according to the invention is general and avoids low-level hardware dependencies by abstracting the necessary vector operations that should be available on all candidate CPUs.

According to the invention, very high performance is achieved for arbitrary kernels and images, significantly outperforming current methods.

The invention and its attributes and advantages will be further understood and appreciated with reference to the detailed description below of presently contemplated embodiments, taken in conjunction with the accompanying drawings.

BRIEF DESCRIPTION OF THE DRAWINGS

The preferred embodiments of the invention will be described in conjunction with the appended drawings provided to illustrate and not to limit the invention.

FIG. 2 illustrates an algorithm for computing optimal block size for maximal throughput.

FIG. 5 illustrates an algorithm for computing fast and parallel convolutions.

FIG. 6 illustrates a graph of results for running times for 2D convolutions and cross correlations for select CPUs.

FIG. 7 illustrates a graph of results for throughput that corresponds to the running times as shown in FIG. 5.

FIG. 8 is a table directed to comparative results for real-time image and video processing.

DETAILED DESCRIPTION OF EMBODIMENTS OF THE INVENTION

The invention is directed to a system and methods for computing convolutions and cross-correlations for large image databases or databases including videos of large image sizes. The invention can be used for computing convolutions of entire images or use overlap-and-add to compute convolutions over very large images with small to large kernels (size comparable to local cache memory). A linear convolution output is computed using 2D FFTs. The invention expands the standard use of 2D FFTs for computing convolutions to image sequences of arbitrary sizes on modern architectures to support wider applications and higher performance.

Figure 1:
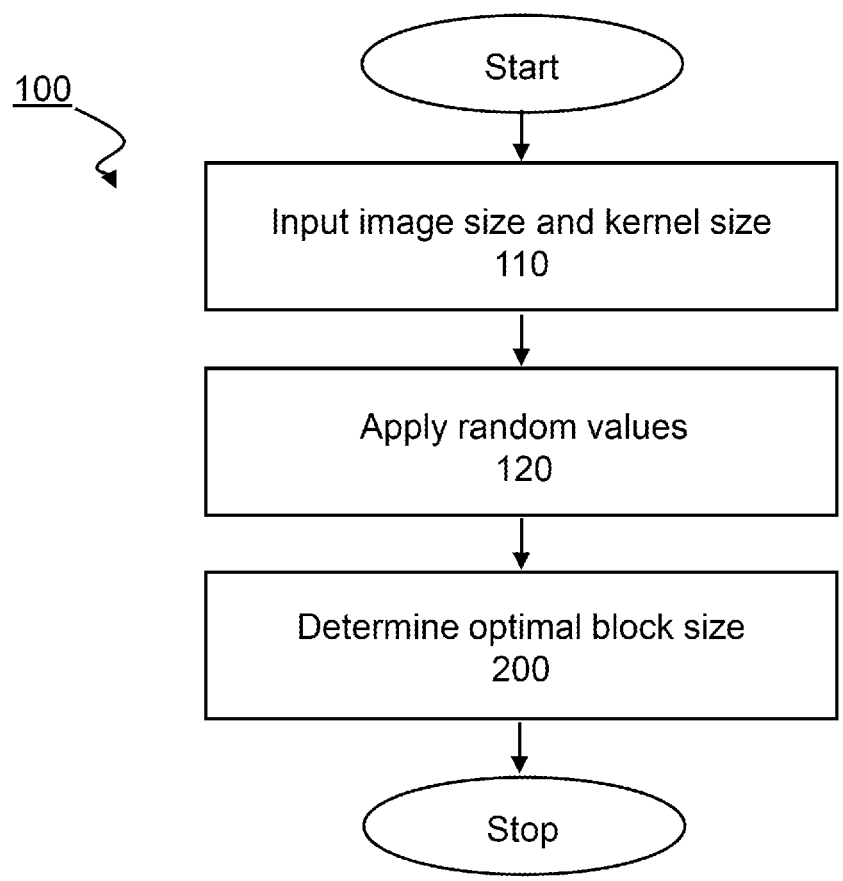
FIG. 1 is directed to a flow chart for computing optimal block size for maximal throughput.

FIG. 1 is directed to a flow chart 100 for computing optimal block size for maximal throughput. This is done by attempting different block sizes. At step 110, a large image size and kernel size are input. Random values are applied at step 120 so that an optimal block size for a large image is determined at step 200 (see FIG. 3).

FIG. 2 illustrates an algorithm for computing optimal block size for maximal throughput. Determining optimal block size for maximal throughput includes FastCpuConv for determining the optimal block size N×N for computing linear convolutions. For optimization, performance of different block sizes for an entire image is computed. To compute cross-correlations, the convolution kernel is flipped along the rows and columns and the flipped kernel is used an input.

Figure 3:
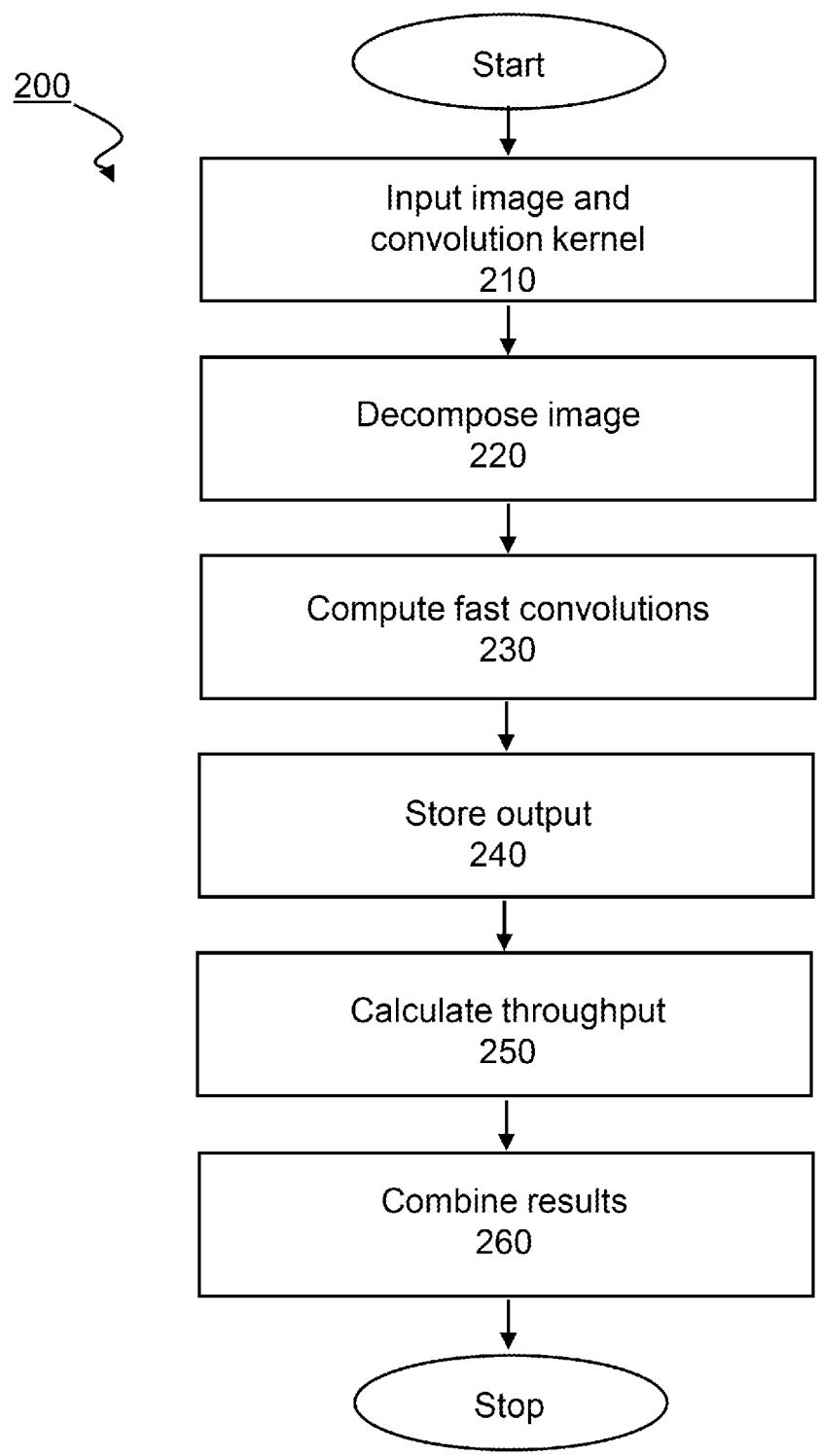
FIG. 3 is a flow chart of FastCpuConv for applying fast convolutions for a given block size.

FIG. 3 is a flow chart of FastCpuConv for applying fast convolutions for a given block size. An image of arbitrarily large size is received as input at step 210. The image may be from a large image database or a database including videos of large image sizes. Also received at step 210 is a convolution kernel of size Q×Q. The image is decomposed into block sizes P×P at step 220. Fast convolutions of each image block are computed at step 230 with the convolution kernel (see FIG. 4 and FIG. 5). At step 240, an output is stored in N×N blocks wherein N≥P+Q−1. At step 250, the throughput is calculated as a function of a number of output pixels N×N over the execution time of each block to obtain a result. At step 260, results are combined using an overlap-and-add method and a final output image is computed.

Figure 4:
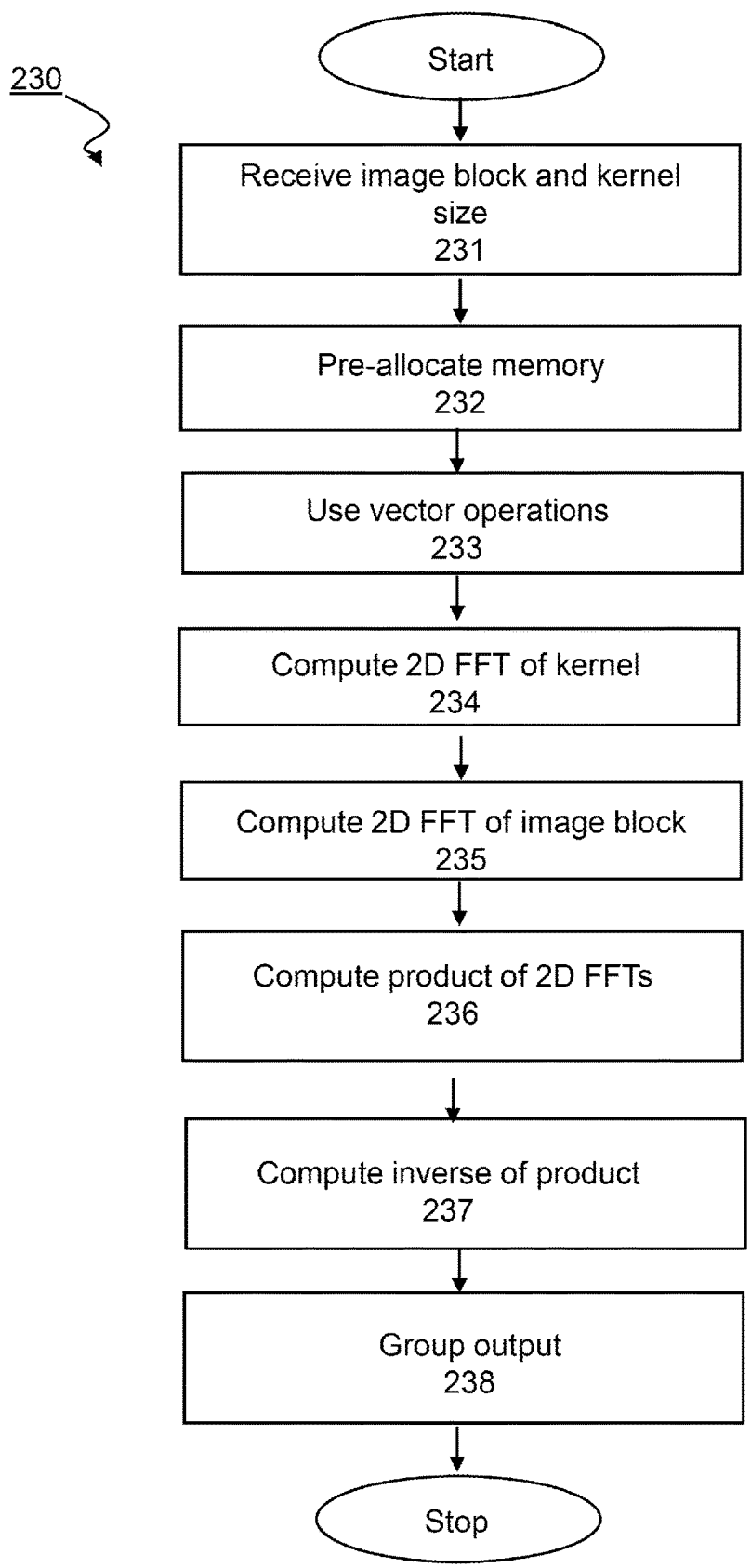
FIG. 4 is a flow chart of FastParConv for computing fast and parallel convolutions.

Step 230 for computing fast convolutions of each image block is further described in FIG. 4. Size optimization is used so that large image sizes (which can lead to diminished performance) are ensured to fit in local cache. Size optimization seeks to determine the optimal image block size that provides the maximum throughput, which is done by breaking each image into optimal blocks. Pre-optimized 2D FFT functions are used. The underlying 2D forward and inverse FFTs are assumed to: (i) use conjugate symmetry for real-valued images and kernels, (ii) utilize the use of multiple cores to launch multiple threads, and (ii) use the underlying SIMD architecture within each thread for optimized computation.

FIG. 4 is a flow chart directed to steps for performance optimization by computing fast and parallel convolutions. At step 231, an image block of size P×P and the convolution kernel of size Q×Q is received. Memory N×N is pre-allocated at step 232. Pre-allocated memory is larger than the minimum required for computing linear convolutions. At step 233, vector operations are used to zero-pad and copy the image block, the convolution kernel, and the output, wherein N≥P+Q−1. A 2D FFT is computed at step 234 of the zero-padded kernel. This is performed only once and the result for all subsequent image blocks is stored. At step 235, a 2D FFT of the zero-padded image block is computed. A product of the 2D FFTs is computed using vector multiplication operations at step 236. At step 237, an inverse 2D FFT of the product is computed. At step 238, vector operations are used to crop an output image block to N.

Performance of different block sizes is timed. Since the kernel is significantly smaller than the full image size (N≪n), the overhead associated with adding the contributions from the neighboring blocks is ignored, i.e., the number of additions is relatively small. The maximum block size is selected that has a maximum rate of a number of processed frame pixels per second. The optimal image block size ($n_{opt}$) is found so that the throughput function p(.) is maximized:

$$\max_{n \leq i \leq n_{max}} p(i).$$

The invention recognizes that there are 2D FFT algorithms to cover several possible image sizes. Beyond powers of two, libraries can handle sizes $p_1^{i_1} p_2^{i_2} \ldots p_m^{i_m}$, where $p_1$, $p_2, \ldots, p_m$ are prime and $i_1, i_2, \ldots, i_m$ are non-negative integers. It is assumed that the underlying architecture supports $p_1$=2 at-least. Then, the optimal size is searched between the kernel size, for minimum blocks of 1 pixel, and the next available power of two (N+n−1), for the maximum possible block size.

FIG. 5 illustrates an algorithm for optimization on CPUs.

The invention is implemented on two CPUs with results shown in FIG. 6 and FIG. 7. The CPUs are an Intel i7-4710MQ@2.5 GHz with 4 physical cores and an Intel Xeon E5-2630v3@3.2 GHz with 8 physical cores. FIG. 6 illustrates a graph of results for running times for 2D convolutions and cross correlations for these CPUs. Xeon MT refers to the use of a parallel FFT using a thread per physical core. Xeon ST refers to the use of FFT running on a single thread. Similarly, i7 MT refers to the use of multiple threads on the i7. FIG. 7 illustrates a graph of results for throughput that corresponds to the running times as shown in FIG. 6.

Comparative results for real-time image and video processing at 30 frames per second (fps) and 60 fps are presented in FIG. 8. The output convolved image size is reported in the left column and the convolution kernel size is reported in the right column. In the last three rows, results with Tensorflow 2.0 are provided. As shown, processing at 60 fps requires a maximum of 16.7 millisecond (ms) per frame, while 30 fps requires only 33.3 ms per frame. The present invention outperforms Tensorflow 2.0, for example for 5×5 kernels and 11×11 kernels.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A maximum throughput method for computing 2D convolutions, comprising the steps of finding the optimal value for N that maximizes throughput:

receiving an image of arbitrarily large size, and a convolution kernel of size Q×Q;

decomposing the image into block sizes P×P;

computing fast convolutions of each image block with the convolution kernel;

storing an output in N×N blocks wherein N≥P+Q−1;

calculating the throughput as a function of a number of output pixels N×N over the execution time of each block to obtain a result;

combining results using an overlap-and-add method to compute a final output image; and determining an optimal size N that provides the maximum throughput among all considered block sizes.

2. The method according to claim 1, wherein the step of computing fast convolutions of each image block further comprises the steps of:

receiving an image block of size P×P and the convolution kernel of size Q×Q;

pre-allocating memory N×N;

using vector operations to zero-pad and copy the image block, the convolution kernel, and the output, wherein N≥P+Q−1;

computing a 2D FFT of the zero-padded kernel only once and storing the result for all subsequent image blocks;

computing a 2D FFT of the zero-padded image block;

computing a product of the 2D FFTs using vector multiplication operations;

computing an inverse 2D FFT of the product; and cropping an output image block to N×N using vector operations.

3. The method according to claim 2, wherein the pre-allocated memory is larger than a minimum required for computing linear convolutions.

4. The method according to claim 1, wherein the image is from a large image database or a database including videos of large image sizes.

\* \* \* \* \*